United States Patent [19]

Gaffney et al.

[11] Patent Number: 4,589,629
[45] Date of Patent: May 20, 1986

[54] NON-RISE FAUCET ASSEMBLY

[75] Inventors: Thomas E. Gaffney, Kenosha; Scott C. Baker, Palmyra, both of Wis.

[73] Assignee: Universal-Rundle Corporation, New Castle, Pa.

[21] Appl. No.: 679,991

[22] Filed: Dec. 10, 1984

[51] Int. Cl.⁴ .................. F16K 31/44; F16K 51/00
[52] U.S. Cl. .................... 251/288; 251/292; 251/310
[58] Field of Search ............... 251/286, 288, 292, 310; 137/315

[56] References Cited

U.S. PATENT DOCUMENTS

| | | | |
|---|---|---|---|
| Re. 30,559 | 3/1981 | Schmitt | 137/315 |
| 2,105,331 | 1/1938 | Rasmussen | 251/310 |
| 2,700,529 | 1/1955 | Svenson | 251/310 |
| 3,107,546 | 10/1963 | Rowland | 251/288 |
| 3,204,656 | 9/1965 | Moen | 137/454.2 |
| 3,301,271 | 1/1967 | Burke | 137/315 |
| 3,342,273 | 9/1967 | Crane | 170/160.53 |
| 3,435,842 | 4/1969 | Ogawa | 137/454.6 |
| 3,456,679 | 7/1969 | Graham | 137/315 |
| 3,458,172 | 7/1969 | Burrows | 251/174 |
| 3,529,621 | 9/1970 | Christiansen | 137/315 |
| 3,529,807 | 9/1970 | Pechacek et al. | 251/218 |
| 3,533,436 | 10/1970 | Parkison | 137/359 |
| 3,570,537 | 3/1971 | Kelly | 137/625.15 |
| 3,625,554 | 12/1971 | Mottais et al. | 287/52.05 |
| 3,687,414 | 8/1972 | Petty | 251/77 |
| 3,788,601 | 1/1974 | Schmitt | 251/304 |
| 3,804,117 | 4/1974 | Collignon | 137/606 |
| 3,814,120 | 6/1974 | Moen | 137/242 |
| 3,916,951 | 11/1975 | Schmitt | 137/625.41 |
| 4,064,904 | 12/1977 | Tolnai | 137/454.5 |
| 4,078,763 | 3/1978 | Yamamoto | 251/96 |
| 4,109,672 | 8/1978 | Szemeredi | 137/315 |
| 4,301,823 | 11/1981 | Meisenheimer | 137/68 R |
| 4,331,176 | 5/1982 | Parkison | 137/454.5 |
| 4,376,445 | 3/1983 | Meisenheimer et al. | 137/68 R |
| 4,418,888 | 12/1983 | Jacobson et al. | 251/216 |

Primary Examiner—Martin P. Schwadron
Assistant Examiner—Sheri M. Novack
Attorney, Agent, or Firm—Wood, Dalton, Phillips, Mason & Rowe

[57] ABSTRACT

A non-rise faucet assembly including a shank having a lower end through which fluid is introduced and also having an upper end with a chamber in fluid communication with the lower end. A removable stem adapted for insertion into the chamber and having a lower end forming a movable valve in the chamber is provided to permit regulated flow of fluid through the faucet assembly. The stem has an axis of rotation about which the valve is movable in response to non-rising rotation of the stem within the chamber in the shank. One of the shank and the stem has a bore arranged generally transversely of the axis of rotation of the stem and the other of the shank and the stem has a pair of diametrically opposed slots in alignment with the bore after the stem has been inserted into the chamber in the shank. The slots and the bore define a continuous passageway through the shank and the stem. A handle adapted to be secured to the upper end of the stem is provided to prevent access to and unintended removal of a unitary stop-lock member having a portion adapted to extend completely through the bore and the slots. With this construction, the unitary stop-lock member retains and limits rotation of the stem in the chamber.

17 Claims, 10 Drawing Figures

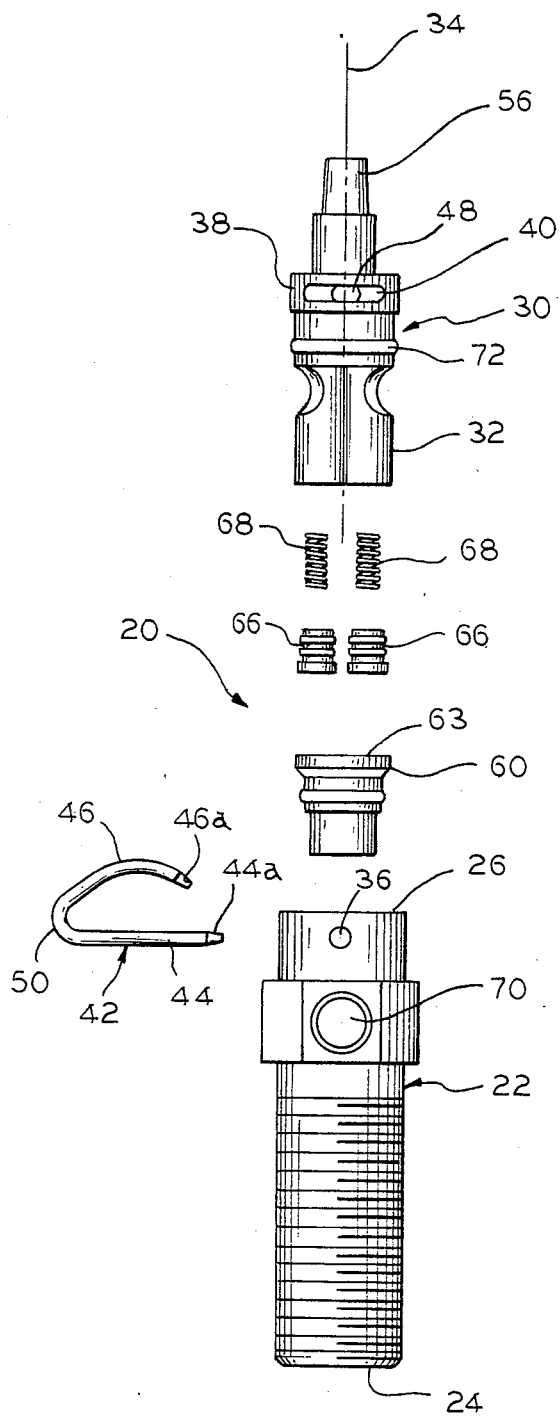
FIG.1
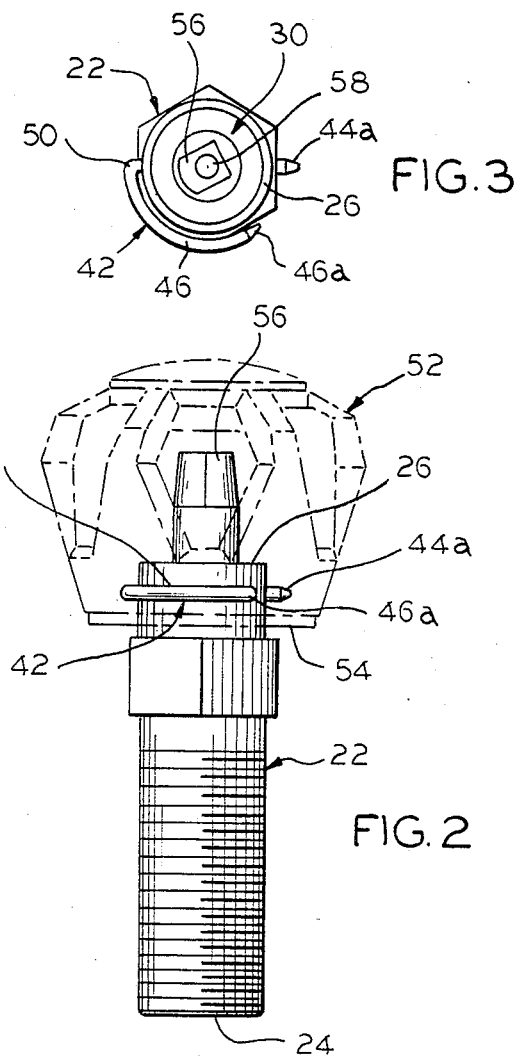
FIG.2
FIG.3
FIG.4

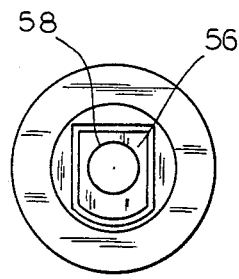
FIG.6
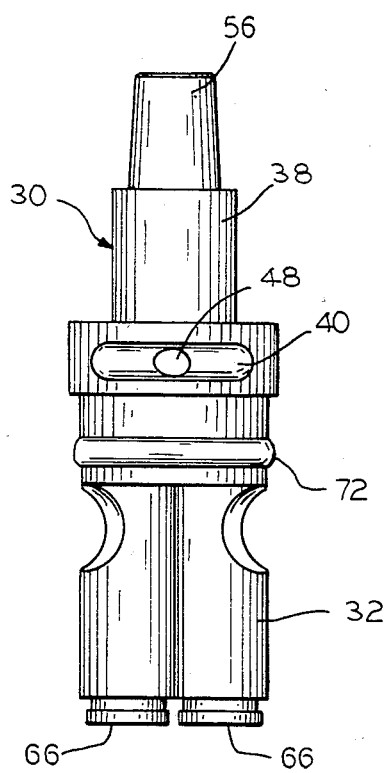
FIG.5
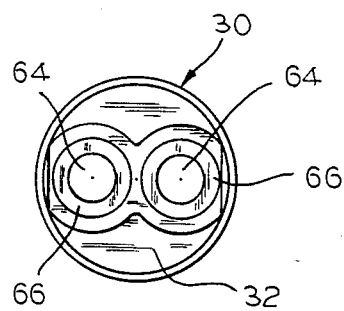
FIG.7
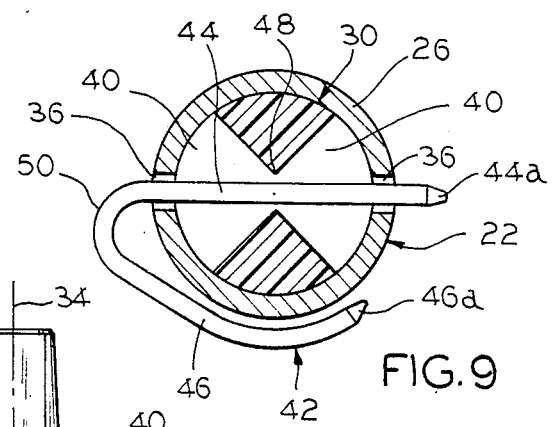
FIG.9
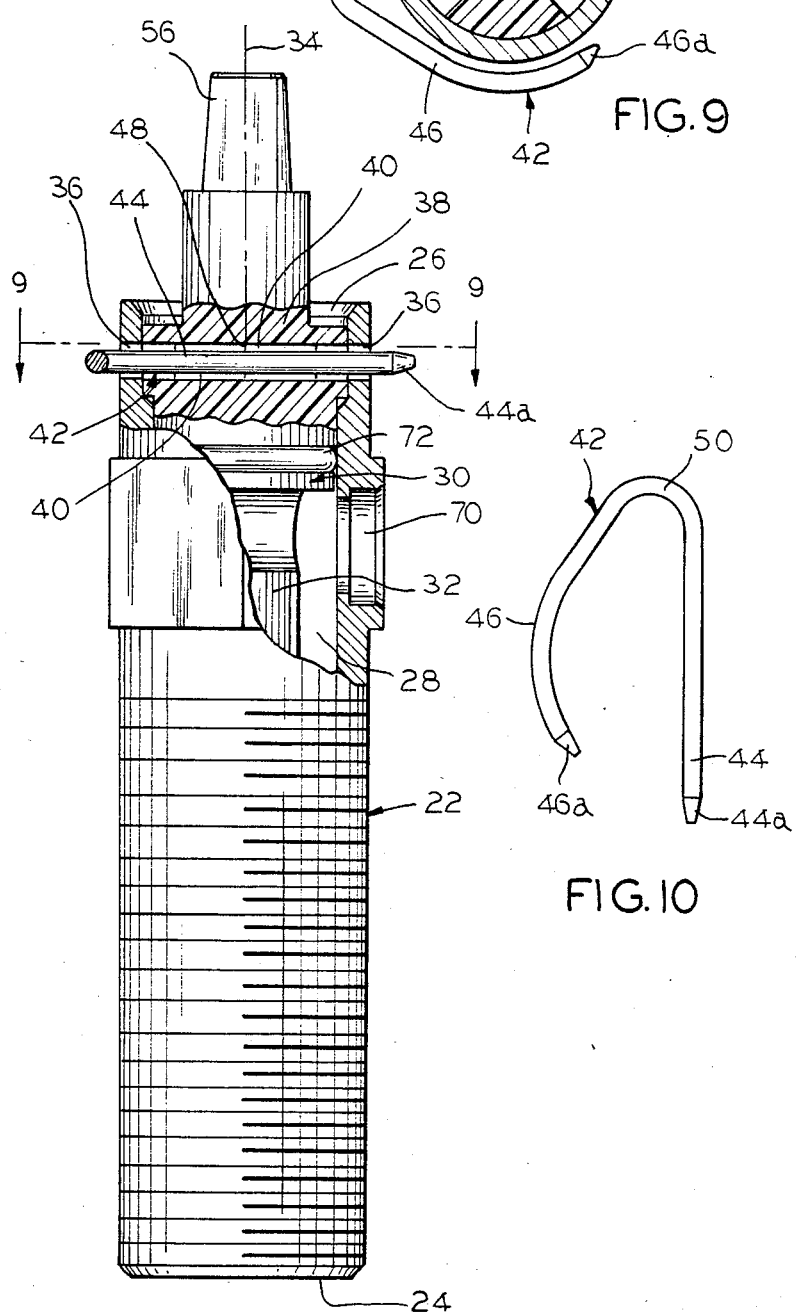
FIG.8
FIG.10

NON-RISE FAUCET ASSEMBLY

BACKGROUND OF THE INVENTION

The present invention relates to a non-rise faucet assembly and, more particularly, to a non-rise faucet assembly having a unitary stop-lock member.

In recent years, non-rise faucet assemblies in which a disc valve member forms a valve with apertures in an insert or the shank body have become widely accepted in the plumbing industry. Among the non-rise faucets proposed and utilized are those disclosed in commonly owned U.S. Pat. No. 3,788,601 which issued Jan. 29, 1974, and is entitled Non-Rise Valve for Faucets or the Like and U.S. Pat. No. 3,916,951 which issued Nov. 4, 1975, for Hot and Cold Water Mixing Valve. In addition, a removable retainer clip for such faucets is disclosed in commonly owned U.S. Pat. No. Re. 30,559 which issued Mar. 31, 1981, for Non-Rise Faucet Assembly wherein the clip is received in a generally transverse slot in the shank for holding the stem in position.

With faucets of the type mentioned, the stems must be accurately positioned within the shank so as to provide proper sealing of the valve. At the same time, the stem must be readily and easily removed for replacement of the O-rings or repair of other parts and for cleaning thereof. In addition, the manufacture and assembly of the faucet must be accomplished without undue difficulty or expense notwithstanding the tolerances which must be maintained.

With these criteria, it is highly desirable to be able to assemble the components with a minimum of effort without special tools. It is important, however, to have extremely secure means for retaining the stem in the chamber against the force exerted by the pressure of water in the water supply line in order to protect against possible personal injury and water damage should the stem be blown out of the shank, and it is likewise important to provide a definite stop for limiting rotation of the stem in the shank to provide distinct on and off positions. Moreover, it has remained to combine these features into a single effective and inexpensive element capable of meeting the other important criteria for non-rise faucet assemblies.

SUMMARY OF THE INVENTION

Accordingly, the present invention is directed to a non-rise faucet assembly including a shank having an upper end with a chamber in fluid communication with the lower end. A removable stem adapted for insertion into the chamber and having a lower end forming a movable valve in the chamber is provided to permit regulated flow of fluid through the faucet assembly. The stem has an axis of rotation about which the valve is movable in response to non-rising rotation of the stem within the chamber in the shank. One of the stem and the shank has a bore arranged generally transversely of the axis of rotation of the stem and the other of the shank and the stem has a pair of diametrically opposed slots in alignment with the bore after the stem has been inserted into the chamber in the shank. The slots and the bore define a continuous passageway through the shank and the stem. A handle adapted to be secured to the upper end of the stem is provided to prevent access to and unintended removal of a unitary stop-lock means having a portion adapted to extend completely through the bore and the slots. With this construction, the unitary stop-lock means is adapted to retain and limit rotation of the stem in the chamber.

In the preferred embodiment, the shank has a pair of diametrically aligned bores in the upper end arranged generally transversely of the axis of rotation of the stem. It is also preferred for the stem to have an upper end with a pair of diametrically opposed V-shaped slots in alignment with the bores after the stem has been inserted into the chamber in the shank. With this arrangement, the V-shaped slots converge inwardly from the outer surface of the stem to be in communication at the axis of rotation to define with the bores in the shank a continuous passageway through the shank and the stem.

More particularly, the first portion of the unitary stop-lock means is a pin portion having a diameter the same as or less than the height of the V-shaped slots. Advantageously, the pin portion is also of a diameter the same as or less than the diameter of the bores and is of a length the same as or greater than the diameter of the shank, and the V-shaped slots are in communication through a generally eliptical opening having a major dimension in the plane of the slots and a minor dimension transverse to the plane of the slots. Moreover, the minor dimension of the generally eliptical opening is the same as or greater than the diameter of the pin portion of the unitary stop-lock means.

In addition, the second portion of the unitary stop-lock means is an arcuate clip portion curved along at least a portion of its length to generally conform to the outer surface of the shank. The pin portion is then advantageously adapted for insertion through the bores and the V-shaped slots with the clip portion disposed above the shank. Thereafter, the clip portion is adapted to be resiliently forced over the upper end of the shank to a position in engagement with or slightly spaced from the outer surface thereof.

Still more particularly, the unitary stop-lock means is preferably a D-shaped retainer. The pin portion and the clip portion advantageously each have a chamfered free end with the free end of the pin portion being adapted for insertion through the bores and the V-shaped slots and the pin portion and the clip portion being integral remote from the free ends thereof. With this arrangement, the D-shaped retainer is preferably formed of metal to act in resilient spring-like fashion.

In addition, the handle provides means for preventing access to and unintended removal of the unitary stop-lock means. The handle is adapted to be secured to the upper end of the stem, which preferably projects above the upper end of the shank, and the handle includes a depending skirt portion extending to a point below the unitary stop-lock means. With the handle in position, the clip portion cannot be resiliently forced back over the upper end of the shank for removal of the pin portion from the bores and V-shaped slots.

Still other objects, features and advantages of the present invention will become apparent from the following description when considered in connection with the accompanying drawings.

BRIEF DESCRIPTION OF THE DRAWINGS

In the drawings:

FIG. 1 is an exploded elevational view illustrating the components of a non-rise faucet assembly in accordance with the present invention;

FIG. 2 is an elevational view of the non-rise faucet assembly in fully assembled condition;

FIG. 3 is a top plan view of the non-rise faucet assembly as illustrated in FIG. 2;

FIG. 4 is a bottom plan view of the non-rise faucet assembly as illustrated in FIG. 2;

FIG. 5 is an elevational view of the stem portion of the non-rise faucet assembly in fully assembled condition;

FIG. 6 is a top plan view of the stem portion as illustrated in FIG. 5;

FIG. 7 is a bottom plan view of the stem portion as illustrated in FIG. 5;

FIG. 8 is an enlarged elevational view, partially in section, of the non-rise faucet assembly;

FIG. 9 is a cross-sectional view taken on the line 9—9 in FIG. 8; and

FIG. 10 is an elevational view of the unitary stop-lock means of the present invention.

DETAILED DESCRIPTION OF THE PREFERRED EMBODIMENT

In the illustration given, and with reference first to FIG. 1, the reference numeral 20 designates generally a non-rise faucet assembly in accordance with the present invention. The assembly 20 includes a shank 22 having a lower end 24 through which fluid is introduced and also having an upper end 26 with a chamber 28 in fluid communication with the lower end 24 (see, also, FIGS. 4 and 8). A removable stem 30 adapted for insertion into the chamber 28 and having a lower end 32 forming a movable valve in the chamber 28 is provided to permit regulated flow of fluid through the faucet assembly 20 (see, also, FIGS. 5 and 7). The stem 30 has an axis of rotation 34 about which the valve 32 is movable in response to non-rising rotation of the stem 30 within the chamber 28 in the shank 22 (see, also, FIG. 8). The shank 22 has a pair of diametrically aligned bores 36 in the upper end 26 arranged generally transversely of the axis of rotation 34 of the stem 30. The stem 30 has an upper end 38 with a pair of diametrically opposed V-shaped slots 40 in alignment with the bores 36 after the stem 30 has been inserted into the chamber 28 in the shank 22 (see, also, FIG. 9). The V-shaped slots converge inwardly from the outer surface of the stem 30 to be in communication at the axis of rotation 34 to define with the bores 36 in the shank 22 a continuous passageway through the shank 22 and the stem 30. A unitary stop-lock member 42 for retaining and limiting rotation of the stem 30 in the chamber 28 is also provided having a first portion 44 adapted to extend completely through the bores 36 and the V-shaped slots 40 and a second portion 46 adapted for resilient forced engagement over the upper end 26 of the shank 22 (see, also, FIGS. 9 and 10). In addition, means are provided for preventing access to and unintended removal of the unitary stop-lock member 42 as will be discussed in detail hereinafter.

Referring to FIGS. 9 and 10, the first portion 44 of the unitary stop-lock member 42 is a pin portion having a diameter the same as or less than the height of the V-shaped slots 40 in the removable stem 30. It will also be appreciated that the pin portion 44 is of a diameter the same as or less than the diameter of the bores 36 and is of a length the same as or greater than the diameter of the shank 22 (see FIG. 8), and the V-shaped slots 40 are in communication through a generally eliptical opening 48 having a major dimension in the plane of the slots 40 and a minor dimension transverse to the plane of the slots 40 (see FIG. 5). More particularly, the minor dimension of the generally eliptical opening 48 is the same as or greater than the diameter of the pin portion 44 of the unitary stop-lock member 42.

As will be seen in FIGS. 9 and 10, the second portion 46 of the unitary stop-lock member 42 is an arcuate clip portion curved along at least a portion of its length to generally conform to the outer surface of the shank 22 of the faucet assembly 20. The pin portion 44 is then adapted for diametrically directed insertion through the bores 36 and the V-shaped slots 40 with the clip portion 46 disposed above the shank 22 (see FIG. 1). Thereafter, the clip portion 46 is adapted to be resiliently forced over the upper end 26 of the shank 22 to a position in engagement with or slightly spaced from the outer surface of the shank 22.

As shown, the unitary stop-lock member 42 is a D-shaped retainer. The pin portion 44 and the clip portion 46 each have a chamfered free end 44a and 46a, respectively, with the free end 44a of the pin portion 44 being adapted for insertion through the bores 36 and the V-shaped slots 40 and the pin portion 44 and the clip portion 46 being integral as at 50 remote from the free ends 44a and 46a thereof. In addition, the D-shaped retainer 42 is preferably formed of metal to act in spring-like fashion.

Referring to FIGS. 1, 2, 8 and 9, the unique features of the D-shaped retainer 42 can be better understood. The stem 30 is initially inserted into the chamber 28 to a point where the V-shaped slots 40 are in alignment with the bores 36 in the shank 22. The free end 44a of the pin portion 44 is then inserted from either side of the shank 22 through one of the bores 36, one of the V-shaped slots 40, the generally eliptical opening 48, the other of the V-shaped slots 40, and the other of the bores 36 with the clip portion 46 disposed above the upper end 26 of the shank 22 until the free end 44a extends out the other side of the shank 22 and the part of the clip portion 46 which is curved to generally conform to the outer surface of the shank 22 is positioned in relative alignment therewith. The D-shaped retainer 42 is then pivoted about the pin portion 44 until the clip portion 46 is resiliently forced over the upper end 26 of the stem 22. When this occurs, the D-shaped retainer 42 is disposed in a plane lying generally transversely of the shank 22 and the stem 30 with the clip portion 46 extending about the shank 22 by greater than 90°.

By comparing FIGS. 2 and 9, it will be appreciated that the D-shaped retainer 42 cannot be longitudinally withdrawn from the bores 36 and the V-shaped slots 40 by reason of the fact that the clip portion 46 extends about the outer surface of the shank 22 by greater than 90°. More particularly, the clip portion 46 extends about the shank 22 to a point greater than 90° from the bore 36 into which the free end 44a of the pin portion 44 is initially inserted (see FIG. 9) and, even though the D-shaped retainer 42 is preferably formed of metal to act in resilient spring-like fashion, the retainer is preferably dimensioned and arranged relative to the shank 22 so as to make it possible to resiliently force the clip portion 46 over the upper end 26 of the shank 22 during assembly but to thereafter make it difficult, if not impossible, to longitudinally withdraw it so long as the clip portion 46 remains in the position illustrated in FIG. 2. However, when it is desired to remove the D-shaped retainer 42, the clip portion 46 need only be resiliently forced back over the upper end 26 of the shank 22 after which it can easily be moved longitudinally to withdraw the pin portion 44 from the bores 36 and the V-shaped slots 40.

As previously mentioned, the faucet assembly 20 includes means for preventing access to and unintended removal of the unitary stop-lock member 42. In particular, a handle 52 adapted to be secured to the upper end 38 of the stem 30 is provided. As shown in FIG. 2, the handle 52 includes a depending skirt portion 54 extending downwardly to a point below the unitary stop-lock member 42.

Referring to FIGS. 3 and 6, the stem 30 includes a non-circular portion 56 projecting upwardly from the upper end 26 of the shank 22 (see, also, FIG. 2). The handle 52 is provided with a mating recess adapted to receive a non-circular portion 56 of the stem 30 and, as will be appreciated, the handle 52 can suitably be secured to the non-circular portion 56 of the stem 30 in conventional fashion by means of a screw provided for insertion into a bore 58 extending into the non-circular portion 58 along the axis of rotation 34 of the stem 30. With this arrangement, the handle 52 prevents access to and unintended removal of the unitary stop-lock member 42 after assembly of the non-rise faucet assembly 20.

Referring to FIG. 9, the V-shaped slots 40 are clearly illustrated in conjunction with the D-shaped retainer 42. It will be seen that each of the V-shaped slots define an angle of approximately 90° and, in cooperation with the pin portion 44 of the D-shaped retainer 42, serve to limit rotation of the stem 30 in the chamber 28 to approximately 90°. As a result, the D-shaped retainer 42 comprises unitary stop-lock means for retaining and limiting rotation of the stem 30.

Referring to FIGS. 1 and 4, the faucet assembly 20 preferably includes a valve insert 60 adapted for insertion into the shank 22. The valve insert 60 will include a pair of bores 62 communicating with fluid from a supply line (not shown) connected to the lower end 24 of the shank 22 and will include a flat surface 63 adapted to cooperate with the lower end 32 of the stem 30 in disc valve fashion wherein the stem 30 includes a corresponding pair of bores 64 (see FIG. 7) having seals 66 biased downwardly against the flat surface 63 of the valve 60 by means of springs 68 such that fluid cannot pass into the chamber 28 when the seals 66 are in alignment with the bores in the valve insert 60 but can pass into the chamber 28 and out of the shank 22 through a bore 70 to a faucet spout (not shown) when the stem 30 has been rotated by approximately 90°. As will be appreciated, fluid is prevented from passing out of the upper end 26 of the shank 22 by reason of the O-ring 72 disposed in a circumferential groove in the stem 30 immediately above the bore 70.

Accordingly, the present invention provides a non-rise faucet assembly having a fluid receiving shank in which an elongated valve stem is removably mounted. The invention accomplishes the objective of providing a unitary stop-lock member capable of retaining and limiting rotation of the stem in a chamber in the shank in a manner preventing accidental removal of the stem but yet permitting easy removal when the stem is to be removed for inspection and/or repair. Moreover, the present invention provides a handle with a downwardly depending skirt that surrounds and covers the unitary stop-lock member to prevent its unintended removal from the faucet assembly.

Various changes coming within the spirit of the present invention may suggest themselves to those skilled in the art. Among these may be providing the slots in the stem and the bore in the shank or, alternatively, providing a form of unitary stop-lock means such as lugs on the stem adapted to snap into slots in the shank and, hence, it will be understood that the invention is not to be limited to the specific embodiment shown and described or the uses mentioned. On the contrary, the specific embodiment and uses are intended to be merely exemplary and the present invention is limited only by the true spirit and scope of the appended claims.

We claim:

1. A non-rise faucet assembly comprising a shank having a lower end through which fluid is introduced and also having an upper end including a chamber in fluid communication with said lower end, a removable stem adapted for insertion into said chamber and having a lower end forming a movable valve in said chamber to permit regulated flow of fluid through said faucet assembly, said stem having an axis of rotation and said valve being movable in response to non-rising rotation of said stem in said chamber about said axis, one of said shank and said stem having a bore arranged generally transversely of said axis of rotation of said stem, the other of said shank and said stem having a pair of diametrically opposed slots in alignment with said bore after said stem has been inserted into said chamber in said shank, said slots and said bore defining a continuous passageway through said shank and said stem, unitary stop-lock means for retaining and limiting rotation of said stem in said chamber including a first portion adapted to extend completely through said bore and said slots, and means for preventing unintended removal of said unitary stop-lock means.

2. The non-rise faucet assembly as defined by claim 1 wherein said unitary stop-lock means includes a second portion adapted for resilient forced engagement over said upper end of said shank.

3. The non-rise faucet assembly as defined by claim 2 wherein said first portion of said unitary stop-lock means is a pin portion, said pair of diametrically opposed slots being generally V-shaped slots, said pin portion being of a diameter the same as or less than the height of said V-shaped slots.

4. The non-rise faucet assembly as defined by claim 3 wherein said pin portion is of a diameter the same as or less than the diameter of said bores, said pin portion being of a length the same as or greater than the diameter of said shank.

5. The non-rise faucet assembly as defined by claim 4 wherein said V-shaped slots are in communication through a generally eliptical opening, said generally eliptical opening having a major dimension in the plane of said slots and a minor dimension transverse to the plane of said slots, said minor dimension being the same as or greater than the diameter of said pin portion.

6. The non-rise faucet assembly as defined by claim 3 wherein said second portion of said unitary stop-lock means is an arcuate clip portion, said clip portion being curved along at least a portion of its length to generally conform to the outer surface of said shank.

7. The non-rise faucet assembly as defined by claim 1 wherein said first portion of said unitary stop-lock means is a pin portion, said pin portion being of a length the same as or greater than the diameter of said shank.

8. The non-rise faucet assembly as defined by claim 7 wherein said pin portion is adapted for insertion through said bores and said V-shaped slots with said clip portion disposed above said shank, said clip portion thereafter being adapted to be resiliently forced over the upper end of said shank to a position in engagement with or slightly spaced from the outer surface of said shank.

9. The non-rise faucet assembly as defined by claim 3 wherein said unitary stop-lock means is a D-shaped retainer, said first portion of said retainer comprising a pin portion, and said second portion of said retainer comprising an arcuate clip portion.

10. The non-rise faucet assembly as defined by claim 9 wherein said pin portion and said clip portion each have a free end, said free ends of said pin portion and said clip portion being chamfered and said free end of said pin portion being adapted for insertion through bores and said V-shaped slots, said pin portion and said clip portion being integral remote from said free ends thereof.

11. The non-rise faucet assembly as defined by claim 10 wherein said D-shaped retainer is formed of metal to act in resilient spring-like fashion.

12. The non-rise faucet assembly as defined by claim 3 wherein said means for preventing unintended removal of said unitary stop-lock means is a handle, said handle being adapted to be secured to the upper end of said stem, said handle including a portion preventing access to said unitary stop-lock means.

13. The non-rise faucet assembly as defined by claim 12 wherein said first portion of said unitary stop-lock means is a pin portion, said second portion of said unitary stop-lock means being an arcuate clip portion, said unitary stop-lock means being formed of a material to act in resilient spring-like fashion.

14. The non-rise faucet assembly as defined by claim 13 wherein said pin portion is adapted for insertion through said bores and said V-shaped slots with said clip portion disposed above said shank, said clip portion thereafter being adapted to be resiliently forced over the upper end of said shank to a position in engagement with or slightly spaced from the outer surface of said shank.

15. The non-rise faucet assembly as defined by claim 3 wherein said V-shaped slots each define an angle of approximately 90°, said V-shaped slots limiting rotation of said stem in said chamber to approximately 90°.

16. The non-rise faucet assembly as defined by claim 12 wherein said stem includes a non-circular portion projecting from the upper end of said shank, said handle having a mating recess adapted to receive said non-circular portion of said stem therein.

17. The non-rise faucet assembly as defined by claim 16 wherein said handle includes a skirt portion depending therefrom, said skirt portion comprising said means for preventing unintended removal of said unitary stop-lock means.

* * * * *